UNITED STATES PATENT OFFICE.

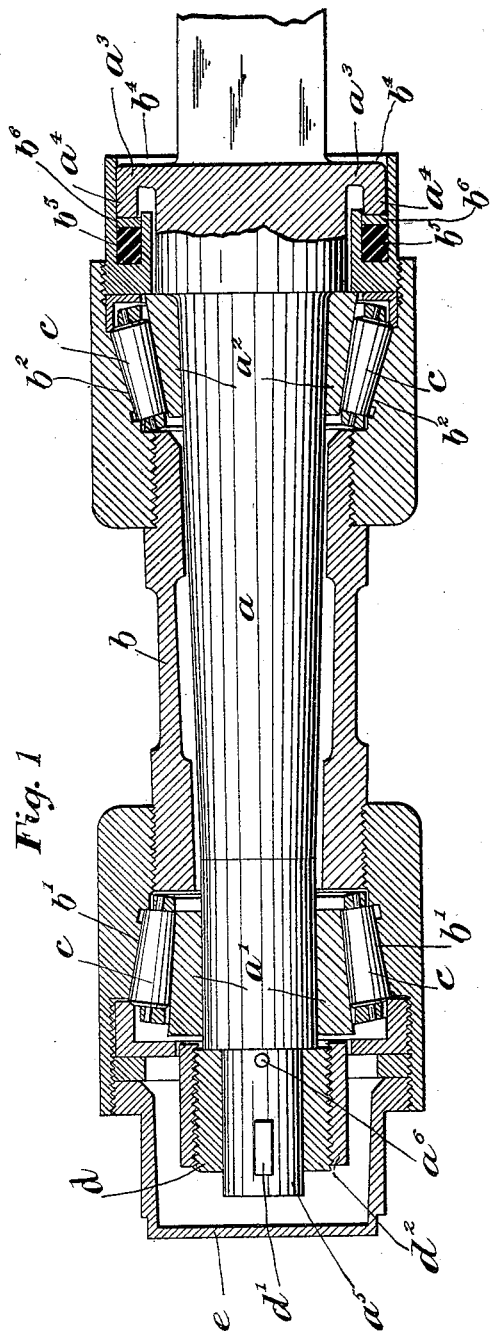
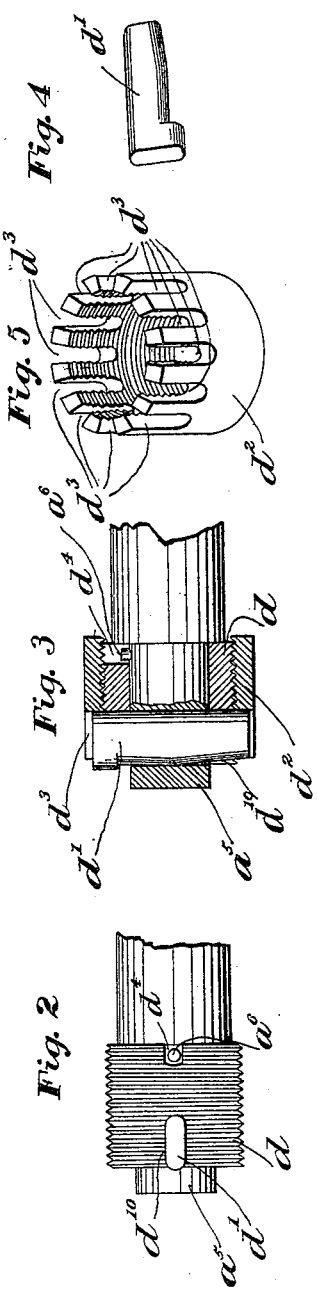

ARTHUR W. GRANT, OF SPRINGFIELD, OHIO, ASSIGNOR TO THE RUBBER TIRE WHEEL COMPANY, OF SAME PLACE.

ANTIFRICTION-BEARING.

SPECIFICATION forming part of Letters Patent No. 622,041, dated March 28, 1899.

Application filed September 20, 1898. Serial No. 691,480. (No model.)

*To all whom it may concern:*

Be it known that I, ARTHUR W. GRANT, a citizen of the United States, residing at Springfield, in the county of Clark and State of Ohio, have invented certain new and useful Improvements in Antifriction-Bearings, of which the following is a specification.

My invention relates to improvements in antifriction-bearings for vehicles; and the object of my invention is to provide a suitable bearing for vehicles, preferably in the nature of a roller-bearing, which is capable of adjustment for wear or otherwise and will also admit of ready removal with all of the parts retained in their normal positions.

My invention consists in the various constructions and combinations of parts hereinafter described, and set forth in the claims.

In the accompanying drawings, Figure 1 is a sectional view of a device embodying my invention. Fig. 2 is an elevation of the end of the axle, showing the adjustable fastening device. Fig. 3 is a sectional view of the same. Figs. 4 and 5 are detail views of the same.

Like parts are represented by similar letters of reference in the several views.

In the said drawings, $a$ represents the spindle of an ordinary vehicle-axle, and $b$ the hub, which turns on the spindle. The hub is provided at each end with conical chambers $b'$ and $b^2$, in which are placed antifriction-rollers $c$. On the axle $a$ and adapted to extend within these chambers, so as to contact with the inner side of the rollers, are cones $a'$ $a^2$. These parts are all preferably the same or substantially the same in construction as set forth in my prior patent, No. 583,050, issued May 25, 1897, though they may be modified in any suitable manner to attain the results accomplished by an adjustable antifriction-bearing.

At the rear of the spindle I form on the axle a collar $a^3$, having an inwardly-extending annular flange $a^4$, and this flange is adapted to be seated within an annular chamber $b^4$, formed in the end of the hub or part of the hub. Within this annular chamber $b^4$ I place an elastic packing-ring $b^5$, preferably of pure rubber, and on the face of this rubber I place a wearing-ring $b^6$ of vulcanite or similar hard substance. This wearing-ring is adapted to contact with the end of the flange $a^4$ and form with it a bearing, while the elastic packing-ring $b^5$ is compressed in the chamber and presses the wearing-ring $b^6$ at all times in contact with the flange. By this construction, as I have demonstrated in practice, I can form an absolutely water-tight joint, which prevents moisture from getting into the bearing and the oil from getting out. At the same time the friction is very much reduced, the vulcanite forming with the end of the flange a bearing-joint, which is maintained in close contact by the elastic packing of the packing-ring.

At the front end the spindle is reduced to form a straight cylindrical portion $a^5$, on which there is fitted a sleeve $d$. This sleeve is provided with a deep notch $d^{10}$ at one end, on opposite sides, to receive a key $d'$, which I term a "linchpin," which takes the place of the ordinary linchpin of a wagon, the straight cylindrical portion $a^5$ of the spindle being mortised out to receive the linchpin. The outer periphery of the sleeve $d$ is screw-threaded, and there is screwed thereon a nut $d^2$, having a series of notches $d^3$ at one end adapted to come opposite the notch and mortise in the sleeve and spindle, respectively, and receive the linchpin $d'$. The sleeve $d$ is prevented from turning on the spindle by a pin or projection $a^6$ in the spindle, which engages with a notch $d^4$ in the sleeve. There are preferably two of these notches $d^4$ on opposite sides of the sleeve, so that the sleeve will fit the projection with either side up; but when the pin or projection is in engagement it will bring the notches $d^{10}$ in line with the opening through the spindle to receive the linchpin. The nut $d^2$ on this screw-threaded sleeve is adapted to contact with the cone $a'$ or other adjustable part of the bearing, while the sleeve is preferably adapted to fit snugly on the reduced portion and may shoulder against the larger part of the spindle. By this construction it may be seen that by removing the pin and turning the nut on the sleeve the proper adjustment may be secured of the cones or other adjustable features of the bearings, when upon inserting the pin the parts will be firmly bound together and retained in this position. The nut is preferably made to turn snugly on the sleeve, so that when the pin is removed to remove the hub or other parts of the bearing it may be replaced without changing the adjustment.

The nut and sleeve and other parts are preferably inclosed by a cap $e$, which fits in the hub in the manner hereinafter described in my former patent referred to.

It will be seen that by this construction I provide an adjustable feature which permits the ready adjustment of the bearing. The cone $a'$, sliding on the spindle, will force the hub back in contact with the rollers at the opposite end, which causes the elastic packing to press tightly against the wearing-ring and this in turn against the annular flange on the shaft, thus making all the parts tight, while at the same time upon removing the cap $e$ and the linchpin $d'$ the hub may be readily removed and replaced, the cones and the cages containing the antifriction-rollers coming out in the hub, as described in my former patent.

It is obvious that balls might be substituted for the rollers and the parts otherwise modified with the same results.

Having thus described my invention, I claim—

1. The combination, in an antifriction-bearing, of a spindle and a hub, a sleeve on said spindle, and a nut on said sleeve, a linchpin extending through said spindle and adapted to engage with said nut and sleeve, substantially as and for the purpose specified.

2. The combination, in an antifriction-bearing, of the spindle having the reduced portion, a sleeve thereon, a linchpin extending through said spindle and engaging with notches in said sleeve, a nut screw-threaded on said sleeve and having engaging notches to engage said linchpin, substantially as specified.

3. The combination with the antifriction-bearings, as described, of the spindle having a pin or projection, a sleeve notched to fit said pin or projection, a linchpin extending through openings in said sleeve and spindle, and a screw-threaded nut on said sleeve having notches to engage said linchpin whereby the same is held in different positions of adjustment, substantially as specified.

4. The combination with the spindle and hub, of the cones on said spindle and rollers between said cones and hub, one of said cones being longitudinally movable, as described, an annular flange on said spindle, an annular chamber in said hub, and elastic packing, such as rubber, in said chamber, and a wearing-ring, such as vulcanite, between said flange and packing, a sleeve on said spindle, a nut on said sleeve, said sleeve and nut being held by a linchpin extending through said spindle, one end of said nut contacting with the movable cone, substantially as and for the purpose described.

In testimony whereof I have hereunto set my hand this 15th day of September, 1898.

ARTHUR W. GRANT.

Witnesses:
CHAS. I. WELCH,
EARL G. WELCH.